US008275979B2

(12) United States Patent
Nicklaus et al.

(10) Patent No.: US 8,275,979 B2
(45) Date of Patent: Sep. 25, 2012

(54) INITIALIZATION OF A DATA PROCESSING SYSTEM

(75) Inventors: Walter Nicklaus, Stuttgart (DE); Ralf Schaufler, Boeblingen (DE); Joerg Schulze, Leonberg (DE)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 11/961,376

(22) Filed: Dec. 20, 2007

(65) Prior Publication Data

US 2008/0184024 A1    Jul. 31, 2008

(30) Foreign Application Priority Data

Jan. 30, 2007 (EP) .................................... 07101365

(51) Int. Cl.
*G06F 15/177* (2006.01)
*G06F 9/46* (2006.01)
(52) U.S. Cl. ................. 713/1; 713/2; 717/156; 718/106
(58) Field of Classification Search ................. 713/1, 2, 713/100; 718/106; 717/155–156
See application file for complete search history.

(56) References Cited

U.S. PATENT DOCUMENTS

| | | | |
|---|---|---|---|
| 6,954,870 | B2 | 10/2005 | Chen et al. |
| 7,389,410 | B1* | 6/2008 | Hardman ........................... 713/1 |
| 2003/0055529 | A1* | 3/2003 | Aosawa ........................ 700/220 |
| 2003/0056090 | A1* | 3/2003 | Khanna et al. .................... 713/1 |
| 2004/0139439 | A1* | 7/2004 | Machida et al. .............. 718/105 |
| 2005/0086637 | A1 | 4/2005 | Chatterjee et al. |
| 2005/0108695 | A1* | 5/2005 | Li et al. ........................... 717/144 |
| 2006/0106556 | A1 | 5/2006 | Berger et al. |
| 2008/0098403 | A1* | 4/2008 | Balakrishnan et al. ....... 718/105 |

OTHER PUBLICATIONS

Alves et al "RAS Design for the IBM eServer z900", IBM Journal of Research and Development, vol. 46, No. 4/5, Jul./Sep. 2002, pp. 503-521.
Bieswanger et al. "Hardware Configureation Framework for the IBM eServer z900", IBM Journal of Research and Development, vol. 46, No. 4/5, Jul./Sep. 2002 ,pp. 537-550.
Schubert et al "Accelerating system Integration by Enhancing Hardware, Firmware and Co-Simulation", IBM Journal of Research and Develiopment, vol. 48, No. 3/4, May/Jul. 2004, pp. 5698-581.
Baitinger et al. "System Control Structure of the IBM eServer z900", IBM Journal of Research and Development, vol. 46, No. 4/5 Jul./Sep. 2002, pp. 523-535.
Saalmueller et al "Embedded Controllers for Solving Complex Industry Applications", Proc. of the IEEE SOCC 2006, pp. 149-152.
Kreissig et al. "A Common Multi-Platform Hardware Object Model", ACM OOPSLA 2002 Practitioners Report, ISBN 1-58113-471-1.

* cited by examiner

*Primary Examiner* — Fahmida Rahman
(74) *Attorney, Agent, or Firm* — Steven Chiu

(57) ABSTRACT

Technique for initializing a data processing system. Sequences of initialization steps for selected functional hardware elements of a data processing system are defined and dependencies between the initialization steps are determined. These definition steps are preferably performed during the design and development of the data processing system. The sequences of initialization steps and their dependencies are represented in a single control flow table. This control flow table is then analyzed by a system management controller during an initialization phase of the data processing system. The sequences are associated with selected functional hardware elements and for each associated sequence of initialization steps the system management controller generates and executes a parallel thread of execution.

7 Claims, 5 Drawing Sheets

INITIALIZATION OF A DATA PROCESSING SYSTEM

BACKGROUND OF THE INVENTION

The present invention relates to the power-on initialization steps in data processing systems, particularly in computer systems.

The exponential growth of computing requirements has resulted in the creation of large complex computer systems. Power-on and initialization of these large computer systems up to the point at which normal operating systems are fully available often rely on embedded controllers that facilitate the initialization of a computer system at power-on. An example for such a complex control structure of a computer system is described in F. Baitinger et al "System control structure of the IBM eServer z900", IBM J. Res. & Dev., Vol. 46, No. 4/5, 2002, pp. 523-535.

In such a computer system, the hardware is packaged in multiple hardware "cage enclosures", the so-called cages. The embedded controllers are divided in two categories: support elements and cage controllers. The support elements are optionally redundant with a primary support element and a secondary support element. There is one primary support element in the computer system. The cage controllers are redundant with a master cage controller and a slave cage controller. A cage controller is associated with an entire hardware cage of the computer system. It interacts with the primary support element via a private service control network. In addition, the service control network may be redundant.

The primary support element controls the initialization of the computer system (system control scope), whereas the cage controllers perform the actual system control and monitoring tasks for their associated cages (intra-cage control scope). The cage controller behaves as a proxy between the service element and the actual hardware. The service element maintains and accesses engineering data which describes the initial values for all hardware registers. The power-on initialization steps mainly consist of an IML (Initial Machine Load). Further details of IML steps and their relation to service elements and cage controllers can be found in K.-D. Schubert et al "Accelerating system integration by enhancing hardware, firmware, and co-simulation", IBM J. Res. & Dev., Vol. 48, No. 3/4, 2004, pp. 569-581 (with so-called Flexible Support Processors serving as cage controllers).

This system control structure implies an inherent parallelism for the operation of the cage controllers. It is implemented as a master-slave operating model with the (primary) support element operating as the master and the (master) cage controllers operating as the slaves. However, there are dependencies between the operations of the cage controllers that must be reflected in the operation of the system control tasks performed on the support element. These dependencies are caused by the fact that hardware in the various cages does not work independently from each other.

These dependencies are managed by the hardware object model (HOM) described in A. Bieswanger et al "Hardware configuration framework for the IBM eServer z900", IBM J. Res. & Dev., Vol. 46, No. 4/5, 2002, pp. 537-550. The HOM is used as part of the system control firmware executed on the support elements. Because packaging of functionality provided by hardware components changes with every new computer system platform, computer system hardware components and their functionality are separated in the design of the HOM. It can be controlled at its startup time via configuration rules that are stored in a rule database, which are specific to a computer system. The HOM allows centrally controlling the various IC (Integrated Circuit) chips in the computer system. Since the computer system supports hot-plugging of hardware and since hardware subsystem can be broken and need to be isolated in the system configuration, the HOM needs to be changed dynamically in order to reflect the current state of the computer system.

An example of an HOM is the eServer z900 HOM described in A. Kreissig/J. Armstrong "A Common Multi-Platform Hardware Object Model", ACM OOPSLA 2002 Practitioners Report, ISBN 1-58113-471-1. This HOM inherits some of the design patterns of the eServer z900 HOM. Further details of the actual implementation of the computer system specific HOM configuration are provided in the patent application US 2005/0086637 A1.

With the growing number of chips in complex computer systems (e.g., systems with Multi-Chip Modules), especially in high-end server computer systems, the task of controlling these chips can become time intensive. Even within such chips, multiple subsystems can be operated independently to some extent (e.g., processors supporting SMT—Simultaneous Multi-Threading). The problem may worsen for hardware designs that do not support broadcasting of operations to multiple chips at once.

For example, the IBM eServer z900 has a central clock chip that is connected to all the chips of the functional system structure (in differentiation to the system control structure). This is shown for example in L. C. Alves et al "RAS Design for the IBM eServer z900", IBM J. Res. & Dev., Vol. 46, No. 4/5, 2002, pp. 503-521 (especially FIG. 2). Besides feeding the connected chips with clock signals, the clock chip controls their status as well. Via this clock chip control mechanism, it is possible for a cage controller to address multiple chips at once in order to perform chip control operation or monitor chip status. A detailed implementation for such a method is described in the patent application US 2006/0106556 A1. Other server computer systems might not have such a central clock chip, e.g. IBM System i/System p machines. Instead, every chip is provided with its own clock hardware logic in order to save costs for the additional clock chip hardware.

In system control structures similar to the IBM eServer z900, the cage controllers alone may provide limited parallelization options only. This results from the notion that many computer system relevant data is available to the service elements only, e.g. the engineering data. Consequently, the service element needs to be involved in many parallel operations.

Therefore, parallel operations for controlling chips as part of computer system control operations are highly desired. Typically, parallelization may be performed by changing the design of a HOM and therefore its actual implementation, or by adapting the HOM configuration rules. For example, it is possible to initialize central processing units (CPUs) before initializing their associated memory chips. But this does not fully exploit the capabilities to parallelize operations as both initializations can overlap to some extent (at some point a CPU will access its associated memory chips, but needs to be configured accordingly in order to do so, e.g. via certain register settings).

SUMMARY OF THE INVENTION

The present invention provides an improved technique for initializing a data processing system.

The present invention defines sequences of initialization steps for selected functional hardware elements of a data processing system (e.g., chips, cages, interfaces) and determines the dependencies between these initialization steps. These definition steps are preferably performed during the design and development of the data processing system. Once the dependencies between the initialization steps are determined, it is then possible to automatically parallelize the initialization of the functional hardware elements.

The sequences of initialization steps and their dependencies are represented in a single control flow table, which is automatically analyzed and used for the parallelization. Preferably, the control flow table is implemented in a human-readable format, hence allowing manually creating, modifying, and analyzing the control flow table. This control flow table is then analyzed by a system management controller during an initialization phase of the data processing system. As a result of the analysis, the sequences can be associated with selected functional hardware elements. For each associated sequence of initialization steps, the system management controller can create and execute a parallel thread of execution.

In an embodiment of the invention, dependencies between initialization steps are represented by trigger and wait steps that are inserted in the sequences of initialization steps. When a first parallel thread of execution performs a trigger step, it will signal to other parallel threads of execution that a dependency to the initialization step preceding the trigger step is resolved. When the other parallel threads of execution perform a wait step, they will delay their execution until they receive a signal from the first parallel thread of execution that the dependency for the initialization step following the wait step is resolved. The trigger and wait steps are generic. The dependency to a concrete data processing system is introduced by the connection of such steps.

The automatic parallelization approach of the present invention allows for the increase in the utilization of the system management controller. Delays in the initialization phase of the data processing system that are caused by dependencies between initialization steps for functional hardware element can be minimized.

In some embodiments of the present invention, knowledge about the dependencies between initialization steps is stored and maintained in a single place, the control flow table. This allows for easy and quick modification of the sequence of initialization steps for the functional hardware elements. This is may be helpful for late hardware design changes and hardware and firmware problems that are detected late in the design cycle. In reality, hardware designers often introduce changes late in the development that need to be reflected in the initialization sequence or even lead to additional dependencies between functional hardware elements. For example, it can be realized late that too much power would be consumed when performing many initialization steps of the same type at once (e.g., chip self-tests).

With an increasing number of initialization steps and functional hardware elements in the data processing system, the automatic parallelization approach according to the invention leads to sequences of initialization actions that become more and more unpredictable for the developers of the data processing system. This problem can be seen as a prejudice against the automatic parallelization approach according to the invention. However, this may be overcome by tracing the initialization steps that are currently performed by the system management controller together with a time stamp (e.g., in a central trace data file). In case of an error (either caused by hardware or firmware), the trace data can be analyzed and the concrete sequence of initialization actions can be derived.

BRIEF DESCRIPTION OF THE DRAWINGS

The present invention and its advantages are described in conjunction with the accompanying drawings.

DETAILED DESCRIPTION

Figure 1:
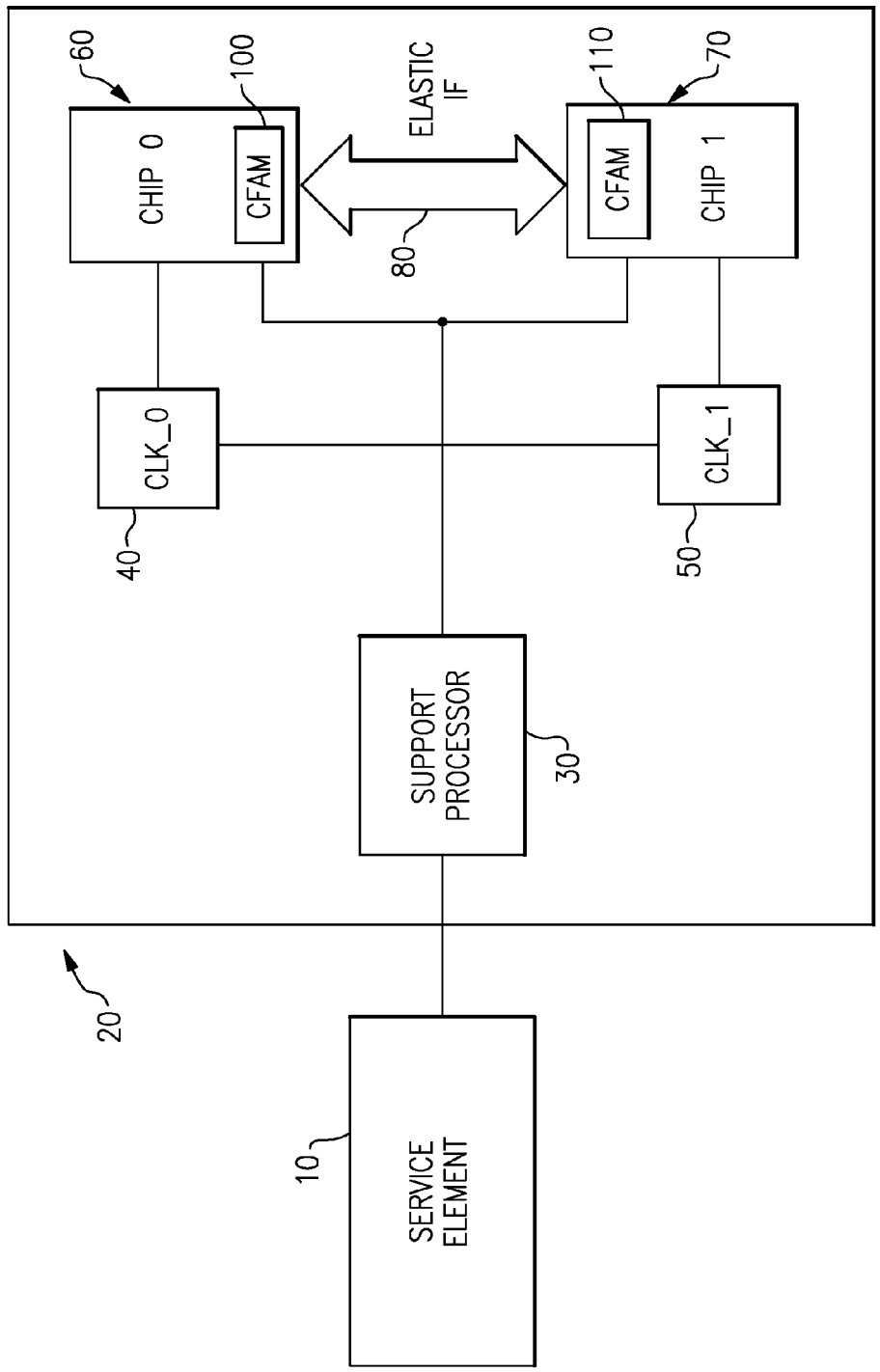
FIG. 1 is a block diagram illustrating the system control structure for a subsystem of a computer system.

FIG. 1 illustrates a system control structure for a subsystem of a computer system used for an embodiment of the present invention. A service element 10 controls a node 20 of the computer system. For example, the node 20 could be a rack-mountable cage for an industry standard (EIA 310-D, IEC 60297 and DIN 41494 SC48D) 19-inch rack. The node 20 houses a support processor 30, which is responsible for the system management of the node 20. The support processor 30 is connected to the service element 10, e.g. via a private system control service network based on Ethernet technology. An example of service element 10 is a personal computer, e.g., an IBM ThinkPad. The service processor 30 can be implemented as an ASIC (Application Specific Integrated Circuit), e.g., the IBM eServer z900 cage controller ASIC (e.g., FIG. 7 in Batinger et al. cited above). A detailed implementation description for such an ASIC is given in J. Saalmueller/J. Wuertz "Embedded Controllers for solving complex Industry Applications", Proc. of the IEEE SOCC 2006.

The collection of computer programs executed on the service element 10 and the support processor 30 is part of the firmware of the computer system. Both the service element 10 and the support processor 30 execute an operating system each, for example an off-the-shelf operating system, possible with some specific modifications due to special hardware requirements. Besides the operating system, additional firmware components are responsible for the system control tasks of the computer system, especially for the computer system initialization tasks.

The node 20 further comprises two independent clock circuits CLK_0 40 and CLK_1 50. CLK_0 40 controls a chip 60, whereas CLK_1 50 controls another chip 70. Examples of such chips include microprocessors serving as CPUs (Central Processing Units) of the computer system. Further chip examples are memory chips. The chips 60 and 70 can be part of a Multi-Chip-Module (MCM), and also the clock circuits CLK_0 40 and CLK_1 50 can be partially or completely comprised in the same MCM. The support processor 30 is connected to CLK_0 40 and CLK_1 50 and to the chips 60 and 70. Examples of such connections include the serial system support interface (SSI) of the IBM eServer z900 (e.g., FIGS. 4 to 6 in Baitinger et al. cited above), I2C (IIC: Inter-Integrated Circuit) busses, GPIO (General Purpose Input/Output) interfaces, UART (Universal Asynchronous Receiver/Transmitter; usually referred to as serial port) interfaces, and JTAG (Joint Test Association Group; IEEE 1149.1 boundary scan standard) interfaces.

The support processor 30 controls the chips 60 and 70 using the CFAM 100 and the CFAM 110 respectively. A CFAM (Common FRU Access Macro; FRU: Field Replaceable Unit) is a specially designed subsystem of a chip that is part of the system control structure of the computer system. In the example implementation for the support processor 30 given in Saalmueller/Wuertz cited above, the support processor uses its PDI (Peripheral Device Interface) and HSI (High Speed Interface) interfaces to access the CFAM 100 and 110.

The chips 60 and 70 are connected via an elastic interface 80, which is a source-synchronous pipelined (bus-pumping) chip-to-chip interface. An example of such an elastic interface connection is described in U.S. Pat. No. 6,954,870 B2. Elastic interface connections require a calibration step before real data payload can be transmitted. In the calibration step timing differences between the various transmission lines are determined, and based on these differences, the chips are configured (e.g., via register settings) accordingly in order to prevent data losses during data transfers on the elastic interface connection. The calibration step is controlled by the support processor 30, but triggered and monitored by the service element 10.

The calibration of the elastic interface 80 may be performed in two steps, one for each direction of the connection. First, the service element 10 writes certain values in dedicated registers in the CFAM 100 via the support processor 30. This places the hardware in the chip 60 responsible for the connection with the elastic interface 80 in a special drive mode. In the drive mode, the chip 60 sends data packages over the elastic interface 80 to the chip 70. In order to enable the chip 70 to receive these data packages, the service element 10 writes certain values in dedicated registers in the CFAM 110. This places the hardware in the chip 70 responsible for the connection with the elastic interface 80 in a special receive mode. Once this calibration step is completed successfully, this is signalled by the chip 70 via certain register values in the CFAM 110. When the support processor 30 detects these values, it notifies the service element 10 accordingly. Then, similar calibrations steps are performed in the other direction of the elastic interface 80 connection.

Figure 4:
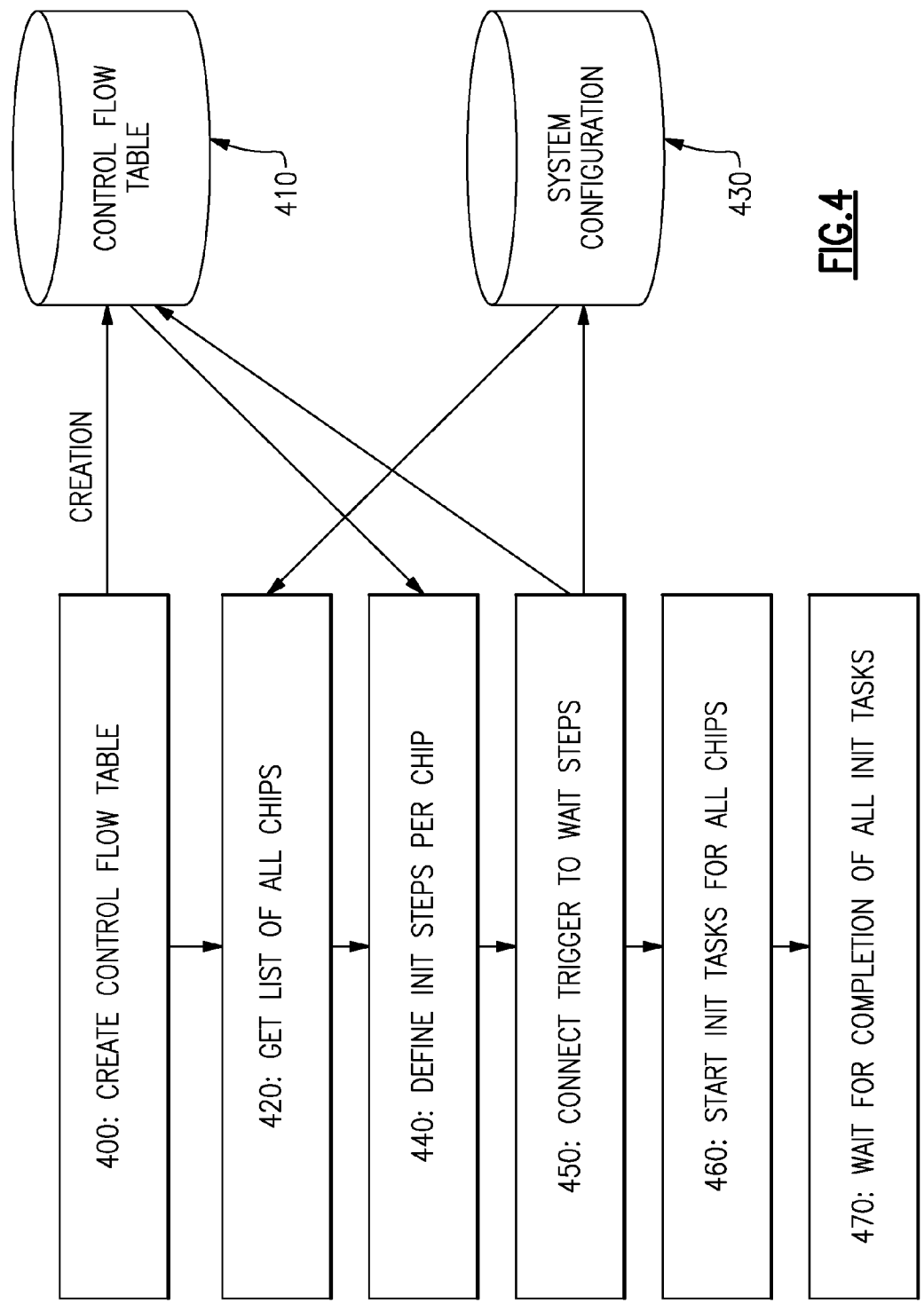
FIG. 4 is a data flow diagram of a method in accordance with an embodiment of the present invention.

For the IBM eServer z900 the calibration steps for the elastic interfaces are performed in step 3 of the IML sequence (e.g., FIG. 4 of Schubert et al cited above). In the same IML step 3 also chip clocks of the IBM eServer z900 are started as needs to be done for the clock circuits CLK_0 40 and CLK_1 50 as well: Elastic interface calibration cannot be started before the respective chip clocks are started. In case multiple chips are connected in cascades (for example, in high end server systems memory chips can be cascaded 3 or 4 times), then the respective elastic interfaces need to be calibrated one after the other following the hierarchies of the cascades. These and similar dependencies for the chip initialization steps in the computer system need to be determined during the development of the computer system, when the chip initialization steps are defined.

Figure 2:
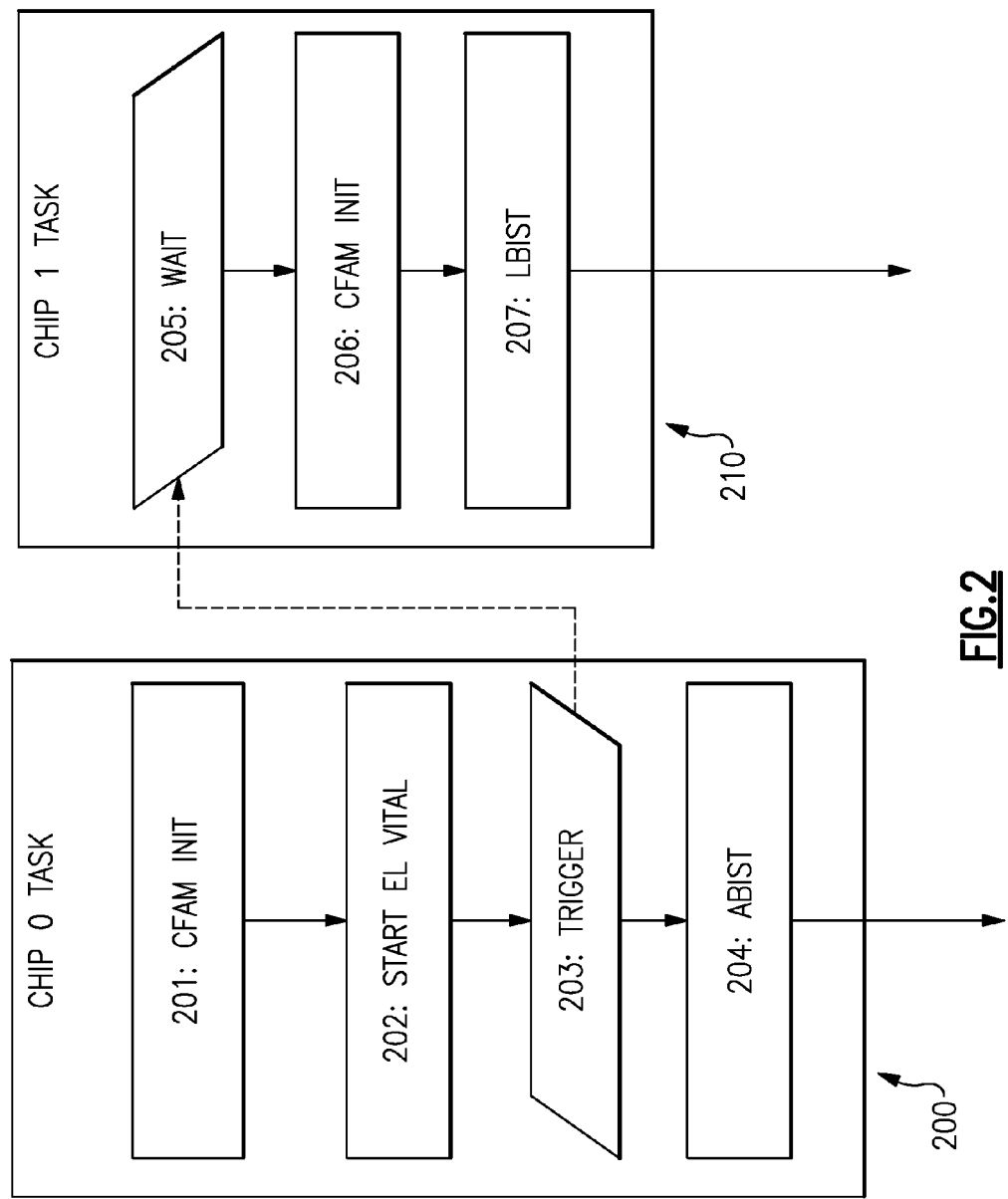
FIG. 2 is a data flow diagram illustrating chip initialization tasks in accordance with an embodiment of the present invention.

According to an embodiment of the invention, a dedicated chip initialization task is executed on the service element 10 for every chip in the computer system in parallel to the chip initialization tasks for the other chips. Such tasks can be implemented using multiple execution threads in a single operating system task, and/or by using dedicated operation system threads. FIG. 2 shows two example chip initialization tasks 200 and 210 for the chips 60 and 70 respectively. The tasks 200 and 210 comprise several chip initialization steps that are executed subsequently for the chips 60 and 70 respectively. In these steps the service element 10 instructs the support processor 30 to perform certain hardware actions in the node 20.

The task 200 starts with the step CFAM init, in which the CFAM 100 of the chip 60 is initialized. In the step start EI vital 202 the calibration of the elastic interface 80 is started. In this step, register settings are performed that enable access to the elastic interface 80. In step trigger 203, a dependency to the initialization of chip 70 is resolved: The initialization of chip 70 has to stop at a certain point and can only continue once the initialization of chip 60 has reached a certain point. According to an embodiment of the invention, the task 210 is waiting, therefore, in the step wait 205 until the task 200 has executed the trigger 203 step. Afterwards, the task 210 continues the initialization of chip 70 by executing the CFAM init 206 step and the LBIST 207 step. In the LBIST 207 step the chip 70 is triggered to perform an LBIST (Logical Built-In Self Test) operation.

In the trigger 203 step, the task 200 notifies the task 210 about its state. Several mechanisms for inter-process or thread communication and synchronization are well-known to persons skilled in the art, which can be used in the trigger 203 step. Once the trigger step was completed (which can happen before the wait 205 step is completed), the task 200 continues with step ABIST 204. In the ABIST 204 step the chip 60 is triggered to perform an ABIST (Autonomous Built-In Self Test) operation. LBIST and ABIST operations are test approaches in which hardware tests itself for correct operation.

Figure 3:
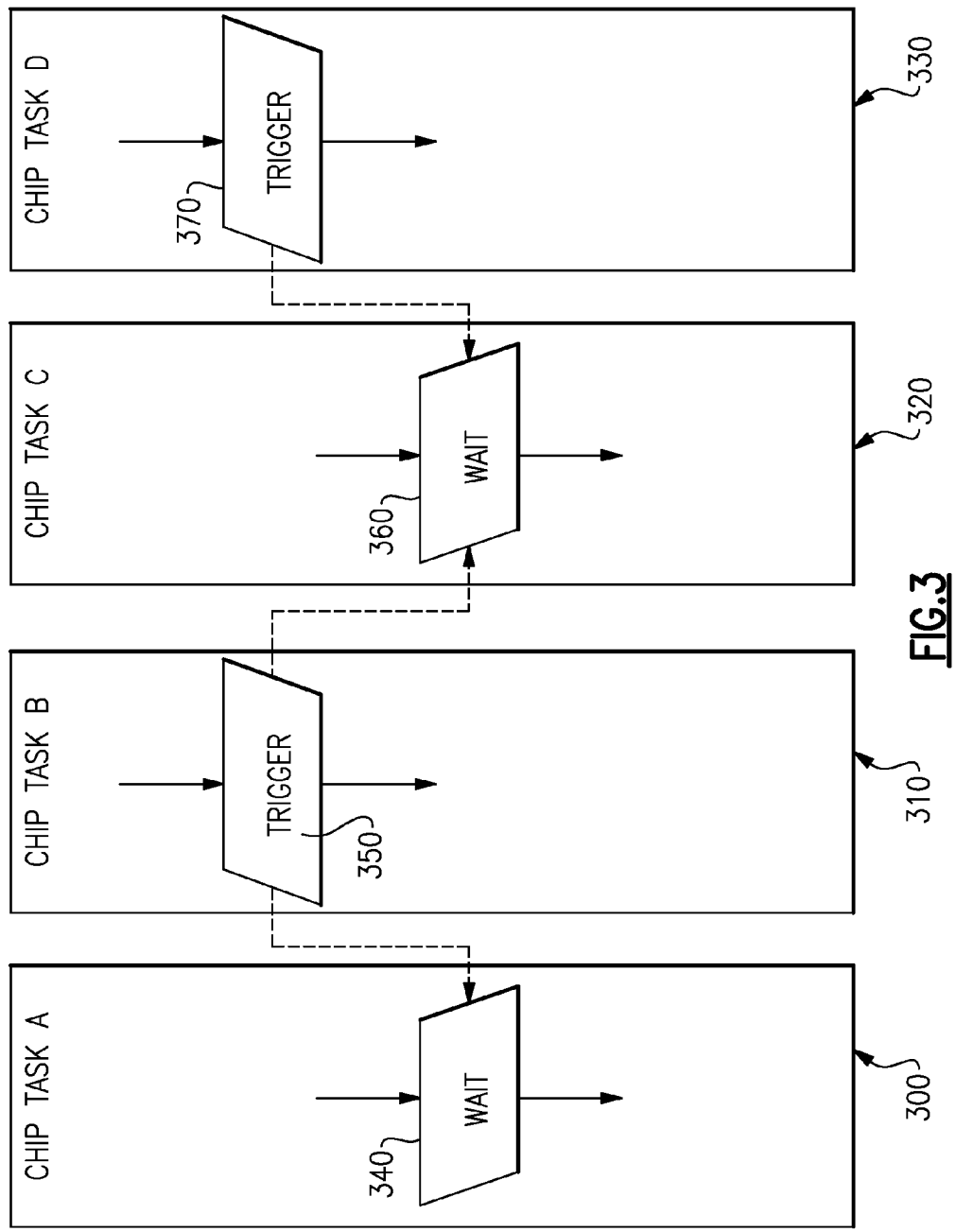
FIG. 3 is a data flow diagram illustrating chip initialization tasks in accordance with an embodiment of the present invention.

FIG. 3 is an example of the dependency resolution according to an embodiment of the present invention between multiple chips. The tasks 300, 310, 320, and 330 are executed in parallel on the service element 10 and are associated to a chip in the computer system. The task 300 has a dependency on the task 310. Therefore, the task 300 waits in the wait 340 step for a notification from the task 310. In the trigger 350 step, this notification is sent from task 310 to task 300. The task 320 has a joint dependency on the task 310 and the task 330. Therefore, the task 320 waits in the wait 360 step for notifications from the tasks 310 and 320. In the trigger 350 step, the task 310 notifies the task 320 that the dependency is fulfilled. In the trigger 370 step, the task 330 notifies the tasks 320 that the dependency is fulfilled. Once the task 320 has received both notifications, it continues its execution with subsequent chip initialization steps.

FIG. 4 is a data flow diagram for a method in accordance with an embodiment of the present invention. In step 400, a control flow table 410 for the chip initialization steps is created manually as part of the development process of the computer system. The control flow table 410 is created by a firmware development team that is responsible for the firmware running on the service element 10 and the support processor 30 in close cooperation with the team responsible for the hardware development of the computer system. Typically, it may take several meetings, workshops and versions of the design documentation until a first version of the control flow table 410 can be created. In the control flow table 410, the chips in the computer system are classified in different types.

The control flow table 410 is stored on a computer-readable medium, e.g., as an XML (extensible Markup Language) file. A simplified example encoding for the dependencies shown in FIG. 2 is given as follows:

```
<ChipInit>
<TARGET type="CHIP 0" class=YinitTaskChipInit0>
<STEP name="CFAM INIT" class=YinitStepCFAMInit />
<STEP name="START EI VITAL" class=YinitStepStartEIVital />
<STEP name="TRIGGER" class=YinitStepTrigger />
<STEP name="ABIST" class=YinitStepABIST />
</TARGET>
<TARGET type="CHIP 1" class=YinitTaskChipInit1>
<STEP name="WAIT" class=YinitStepWait />
<STEP name="CFAM INIT" class=YinitStepCFAMInit />
<STEP name="TRIGGER" class=YinitStepTrigger />
```

```
<STEP name="LBIST" class=YinitStepLBIST />
</TARGET>
</ChipInit>
```

The control flow table 410 is preferably stored in a persistent storage device of the service element 10, e.g., on a hard disk drive or a flash memory device. During initialization of the computer system (e.g., after power-on or reset) a firmware component executed on the service element 10 analyzes the content of the control flow table 410. For example, the content of the control table 410 can be stored in the main memory of the service element 10 in form of an annotated graph structure. The firmware component generates in step 420 a list of all the active chips in the computer system from a system configuration database 430. Example implementations for the system configuration database 430 include the IBM HOMs described above. The system configuration database 430 can be formed by identifying the available hardware components in the node 20. For example, each identifiable hardware component can comprise an SEEPROM (Serial Electrically Erasable Programmable Read-Only Memory) containing unique identification data, which is created during manufacturing of the computer system. The service element 10 reads the SEEPROM data via the support processor 30.

While the system configuration database 430 is unique to the computer system, the control flow table 410 may be generic and can cover the base hardware architecture (e.g., a computer system platform or computer system architecture generation) used for the computer system. It does not have to be model specific, covering a specific model using this base hardware architecture. However, it is also possible to add the content of the control flow table 410 to the system configuration database 430 directly.

In step 440, the firmware component may determine for every chip in the list of active chips its type, and depending on the type, the data associated with this chip type in the control flow table 410 will be used. In the preferred embodiment of the invention, the firmware component is implemented using object-oriented programming technologies. A specific chip class is used for every chip type respectively. These chip classes are subclasses of a generic class YinitTask. Thus, for a chip in the list of active chips, an object chiptask will be generated by the firmware component. This object chiptask is an instantiation of its respective chip class and will be associated with a specific chip using a setTarget method of the generic class YinitTask. In the example XML file shown above the class names are stored in the control flow table directly (YinitTaskChipInit0, YinitTaskChipInit1).

For every chip type, the control flow table 410 comprises a list of initialization steps. For such an initialisation step, the firmware component generates an object chipstep, which is an instantiation of a subclass of a generic class YinitStep. The class YinitTask comprises an ordered list of YinitStep objects, wherein the order represents the sequence in which the initialisation steps need to be performed for the chip type. The firmware component populates this list for an object chiptask using the information from the system configuration database 430. In the example XML file shown above, the class names are stored in the control flow table directly (e.g., YinitStepC-FAMInit, YinitStepStartEIVital).

Thus, if the system configuration database 430 comprises N chips, and each of these N chips needs M initialization steps, then the firmware component generates N chiptask objects and N*M chipstep objects. In particular, the trigger and wait steps are represented by chipstep objects. The corresponding subclasses of YinitStep include the class YinitStepTrigger and the class YinitStepWait.

The system configuration database 430 also comprises all the information, which chips are connected with other chips, e.g. via elastic interfaces. The patent application US 2005/0086637 A1 is provides an example how such information is added to the system configuration database 430. Also for every elastic interface, an object is generated by the firmware component and a corresponding ordered list in the object is populated with objects representing the initialisation steps for this elastic interface.

In step 450, the service element 10 connects all the trigger steps with the corresponding wait steps. This is achieved by the firmware component by calling the method addTrigger of the class YinitStepWait for all the objects representing a wait step. Thus, for a wait step represented by object W that needs to wait for the trigger step represented by object T, the firmware component executes the method with the parameters implementing the pseudo code W.addTrigger(T). In this manner, a wait step can be connected to one or multiple trigger steps and vice versa, hence allowing an m:n relationship between trigger and wait steps.

The relation between trigger steps wait steps is encoded in the XML file using the names of the steps as illustrated by the following XML skeleton:

```
...
<TARGET type="CHIP 0" class=YinitTaskChipInit0>
...
<STEP name="EI VITAL START DONE" class=YinitStepTrigger />
...
</TARGET>
...
<TARGET type="CHIP 1" class=YinitTaskChipInit1 />
...
<STEP name="EI VITAL START DONE" class=YinitStepWait />
...
</TARGET>
```

This allows encoding of dependencies between hardware elements of the computer system (CHIP 0, CHIP 1): These dependencies are encoded by the names of the steps. The firmware component connects the trigger and waits steps with the same name ("EI VITAL START DONE"). As the computer system can comprise multiple hardware elements of the same type, the firmware component queries the system configuration database 430 for additional dependencies between the hardware elements.

For example, a hardware element of the type CHIP 0 and represented by the object CP can be connected to two hardware elements of the type CHIP 1 represented by the objects N1 and N2. This dependency can then be presented to the firmware component by querying the system configuration database 430 which hardware elements are connected to CP. The connection of the trigger and wait steps from the XML skeleton above is then realized by the firmware component as shown in the following pseudo code skeleton:

```
N1.getStep("EI VITAL START DONE") ->
    addTrigger(CP.getStep("EI VITAL START DONE"));
N2.getStep("EI VITAL START DONE") ->
    addTrigger(CP.getStep("EI VITAL START DONE"));
```

By modifying the XML representation of the control flow table 410, trigger and wait steps can be added, deleted, and moved arbitrarily in the sequence of initialization steps of a particular hardware element type.

Instead of using the information stored in the system configuration database, it is also possible to encode such dependencies in the control flow table 410 directly. In case of an XML file representation of the control flow table 410, the XML syntax could be extended accordingly then.

In step 460, the service element 10 can start a thread per chip and per elastic interface in the system configuration database 430. This can be achieved by the firmware component executing a dedicated method of all the created objects representing these chips and elastic interfaces. So for M such objects, M threads can be created and executed in parallel. Such a thread can preferably be an operating system thread or an operating system process of the operating system executed by the service element 10. In such a thread, all the initialization steps for the associated chip can be performed subsequently. The objects representing these initialization steps in the ordered lists of these objects can be processed subsequently based on their position in these lists. In the processing, the firmware component executes a dedicated method of the objects representing the initialization steps.

Finally, in step 470, the firmware component can wait for the completion of all the started threads. After completion of all the threads, all the chips and elastic interfaces are initialized.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of a hardware embodiment, a software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
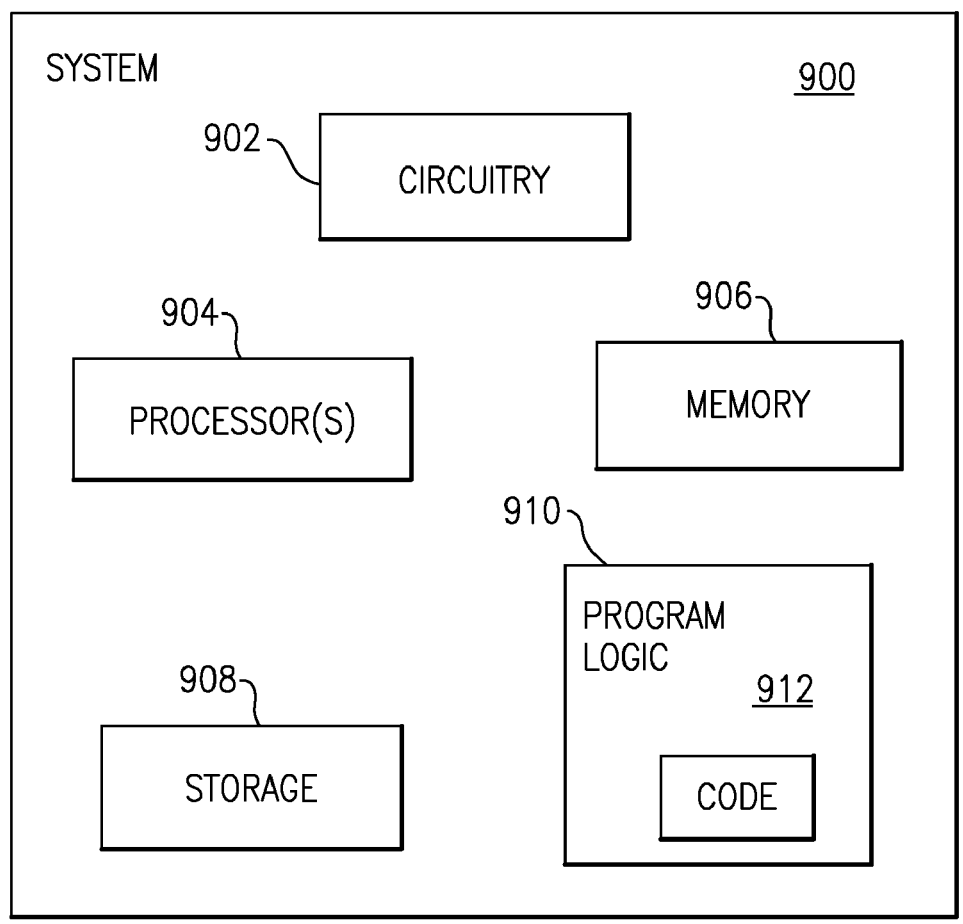
FIG. 5 is a block diagram of a system in which certain embodiments may be implemented.

FIG. 5 illustrates a block diagram of a computer system 900 in which certain embodiments may be implemented. The system 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 5 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for initializing a data processing system comprising functional hardware elements and a system management controller for controlling said functional hardware elements, the method comprising:
defining sequences of initialization steps for selected hardware elements of said functional hardware elements, wherein each sequence of initialization steps is defined for a single selected hardware element of said selected hardware elements;
determining dependencies among said initialization steps;
generating a control flow table representing said sequences of initialization steps and said dependencies;
generating a system configuration database representing a list of all active functional hardware elements in said data processing system;
during an initialization phase of said data processing system, executing on said system management controller the steps:
analyzing said control flow table and said system configuration database;
based on said analyzing said control flow table and said system configuration database, assigning said sequences of initialization steps to said selected hardware elements; and
generating and executing a parallel thread of execution for each of said assigned sequences of initialization steps, wherein said sequences of initialization steps are executed in parallel; and
wherein, said dependencies between said initialization steps are represented by trigger and wait steps that are inserted in said sequences of initialization steps, and a first parallel thread of execution signals a second parallel thread of execution that a dependency is resolved when performing a trigger step, and wherein said second parallel thread of execution stops its execution when performing a wait step until receiving a signal from said first thread of parallel execution.

2. A computer program stored into internal memory of a digital computer system, the computer program comprising software code portions for performing a method when said computer program is executed on said computer system, the method comprising:
defining sequences of initialization steps for selected hardware elements, wherein each sequence of initialization steps is defined for a single selected hardware element of said selected hardware elements;
determining dependencies among said initialization steps;
generating a control flow table representing said sequences of initialization steps and said dependencies;
generating a system configuration database representing a list of all active functional hardware elements in said computer system;
during an initialization phase of said computer system, executing on a system management controller the steps:
analyzing said control flow table and said system configuration database,
based on said analyzing said control flow table and said system configuration database, assigning said sequences of initialization steps to said selected hardware elements; and
generating and executing a parallel thread of execution for each of said assigned sequences of initialization steps, wherein said sequences of initialization steps are executed in parallel; and
wherein said dependencies between said initialization steps are represented by trigger and wait steps that are inserted in said sequences of initialization steps, and a first parallel thread of execution signals a second parallel thread of execution that a dependency is resolved when performing a trigger step, and wherein said second parallel thread of execution stops its execution when performing a wait step until receiving a signal from said first thread of parallel execution.

3. The computer program according to claim 2, wherein said computer system executes an operating system, and wherein for the generation of said parallel threads of execution at least one of the following facilities of said operating system is used: operating system threads, operating system processes.

4. The computer program according to claim 2, wherein the analyzing step, programming objects are used to represent at least one of the following: said selected hardware elements, said initialization steps.

5. A data processing system comprising:

functional hardware elements; and a system management controller for controlling said functional hardware elements, where said system management controller is configured to:

define sequences of initialization steps for selected hardware elements of said functional hardware elements, wherein each sequence of initialization steps is defined for a single selected hardware element of said selected hardware elements;

determine dependencies among said initialization steps;

generate a control flow table representing said sequences of initialization steps and said dependencies;

generate a system configuration database representing a list of all active functional hardware elements in said data processing system; and during an initialization phase of said data processing system, execute on said system management controller the steps:

analyzing said control flow table and said system configuration database;

based on said analyzing said control flow table and said system configuration database, assigning said sequences of initialization steps to said selected hardware elements; and generating and execute executing a parallel thread of execution for each of said assigned sequences of initialization steps, wherein said sequences of initialization steps are executed in parallel; and wherein said dependencies between said initialization steps are represented by trigger and wait steps that are inserted in said sequences of initialization steps, and a first parallel thread of execution signals a second parallel thread of execution that a dependency is resolved when performing a trigger step, and wherein said second parallel thread of execution stops its execution when performing a wait step until receiving a signal from said first thread of parallel execution.

6. The data processing system according to claim 5, further comprising hardware nodes with a subset of said functional hardware elements and a node controller each, where the node controllers are used by said system management controller for the execution of said initialization steps.

7. The data processing system according to claim 5, wherein a persistent storage of said system management controller is used to store at least one of the following: said control flow table, a said system configuration database.

* * * * *